US007989746B2

United States Patent
Chen et al.

(10) Patent No.: US 7,989,746 B2
(45) Date of Patent: Aug. 2, 2011

(54) RAIL-TYPE SOLAR TRACKING SYSTEM WITH FOCUSING FUNCTION

(75) Inventors: Hsuan-Tsung Chen, Chiayi (TW); Pei-Ying Yeh, Taipei (TW); Nien-Chen Lin, Taichung (TW); Jia-Yush Yen, Taipei (TW)

(73) Assignee: National Taiwan University (TW)

( * ) Notice: Subject to any disclaimer, the term of this patent is extended or adjusted under 35 U.S.C. 154(b) by 413 days.

(21) Appl. No.: 12/237,424

(22) Filed: Sep. 25, 2008

(65) Prior Publication Data

US 2010/0012111 A1     Jan. 21, 2010

(30) Foreign Application Priority Data

Jul. 18, 2008    (TW) ................................ 97127500 A

(51) Int. Cl.
     *G01C 21/02*      (2006.01)
     *H01L 31/042*     (2006.01)

(52) U.S. Cl. ..................................... 250/203.4; 136/246

(58) Field of Classification Search ............... 250/203.4, 250/203.6; 136/246
See application file for complete search history.

(56) References Cited

U.S. PATENT DOCUMENTS

| 4,111,184 | A | * | 9/1978 | Fletcher et al. ............... 126/577 |
| 5,707,458 | A | * | 1/1998 | Nagashima et al. .......... 136/246 |
| 6,123,067 | A | | 9/2000 | Warrick | |
| 6,363,928 | B1 | | 4/2002 | Anderson, Jr. | |
| 2009/0250094 | A1 | * | 10/2009 | Robison et al. ............... 136/246 |

* cited by examiner

*Primary Examiner* — Thanh X Luu
(74) *Attorney, Agent, or Firm* — Schmeiser, Olsen & Watts, LLP

(57) ABSTRACT

The invention relates to a rail-type solar tracking system with a focusing function. The invention includes a plurality of support elements, a Fresnel lens, a rail platform, a load bearing platform and a pushing device. The system moves a solar cell on the load bearing platform to a focus position where sunlight is focused by the Fresnel lens to collect solar energy. Hence, the invention collects solar energy without moving heavy lens so as to reduce power consumption and improve the electric power generating efficiency of the solar cell.

6 Claims, 4 Drawing Sheets

RAIL-TYPE SOLAR TRACKING SYSTEM WITH FOCUSING FUNCTION

FIELD OF THE INVENTION

The present invention relates to a rail-type solar tracking system with a focusing function, and more particularly to the use of solar heat by adopting a tracking device.

BACKGROUND OF THE INVENTION

Solar power generation is a typical green power generation with many advantages including its safety, reliability, free of noises, free of pollutions, free of regional limitations, generating power without consuming fuels, requiring no mechanical parts, low failure rate, requiring no patrol or staff on duty, and conveniently combined with a building. These advantages are incomparable among regular power generations and other power generations. The application of solar power is an ideal solution for solving the issue of a continuous development of power by human beings. Countries including Japan, U.S.A., Germany, Netherlands, Italy, Spain, Switzerland, Finland, Austria, England and Canada have established their own development plans for solar power generation. In the new century, these plans are passed in hope of having a strong competitiveness on the research and application of the new green energy.

In the studies of comparing sun-tracking power generation systems and general fixed solar power generation systems, the sun-tracking system has a larger number of hours of sunlight projection daily than the fixed solar power generation systems and is used mainly by satellites or experimental mechanical structures for effectively enhancing system performance and reducing the number of equipments used in the system.

At present, the sun-tracking power generation systems generally use a support stand for supporting a solar panel and adopt a direct rotating design. If a lens for collecting light is installed, then the lens is rotated together with a solar cell. Some systems use a large mirror for reflecting and gathering sunlight or adopt a design of a solar tracking system with springs or a solar tracking system with airbags. Some researches in foreign countries adopt a design of using a shape memory alloy to turn a solar cell towards the sun. In general, the volume of most solar tracking systems having a motor is huge, and the motor consumes lots of power during the tracking process performed by the motor. Furthermore, a huge space is required, and thus it is not easy to move or install such systems. For designs without using a motor, the tracking speed is too slow and unable to timely track the position of the sun due to the limitations of the mechanical structure or its components.

With reference to U.S. Pat. No. 6,123,067 entitled "Solar collector tracking system", a solar energy collector of the tracking system has a multiple of lens modules installed on a front surface which is a central protection mechanical structure disposed at a horizontal shaft of an azimuth platform equipment for protecting a solar energy collector installed on a back surface. An important hydraulic height driving device is installed at the horizontal shaft of the azimuth platform equipment and a piston rod at the front end and connected to the solar energy collector at the rear surface, such that the tracking system is situated at a vertical operating position with a light projection angle substantially equal to 90° and a transversal storing position. A journal of the azimuth platform equipment is extended from the ground to the top of a tower, and a tubular support pillar is provided for protecting the top of the journal. A driving head is extended horizontally on the tubular support pillar and includes a pivot pin extended upward. The front end of the piston rod for primary and second azimuth angle hydraulic driving devices is coupled to the pivot pin. Both ends of the reverse side of the azimuth angle hydraulic driving device protect the interior of the azimuth platform equipment. A hydraulic power device is connected to its hydraulic driving device. An electronic controller receives a signal transmitted from an azimuth encoder transducer and an elevation encoder transducer to move both internal and external piston rods of each hydraulic driving device and rotate the solar energy collector for tracking the sun.

With reference to U.S. Pat. No. 6,363,928 entitled "Solar collection system", the solar tracking mechanical structure is a part of the solar energy collection system. The collection system comprises a light-reflecting housing for gathering the radiation of sunlight to a tube for absorbing the radiation. A thermal conductive fluid is contained in the tube. The reflecting housing is mounted onto a support stand. A driving device is installed between the support stand and the reflecting housing. A solar energy sensor is installed deeply into a visible tube, and the visible tube fixed onto the reflecting housing. At least one line in the visible tube is parallel to the optical axis of the reflecting housing. The solar energy sensor generates a sensing signal serving as a control input of the driving control system. When a limit switch generates a limit stop signal, the reflecting housing reaches its maximum angular position. The driving control system produces a fluid flow based on the solar energy sensor signal and the limit stop signal. This method tracks the sun and also provides a solar cell array.

Since the applications of solar cell emphasize on the enhancement of electric generation efficiency and the reduction of power consumption, therefore it is a subject for the related industry to overcome the aforementioned issues by developing an effective solar tracking system to reduce the system weight and the power consumption while improving the electric power generating efficiency of the solar cell.

SUMMARY OF THE INVENTION

In view of the foregoing shortcomings of the conventional solar tracking system, the inventor of the present invention based on years of experience in the related field to conduct extensive researches and experiments, and finally developed a rail-type solar tracking system with a focusing function to collect solar energy without the need of moving the heavy lenses, and achieve the effects of reducing the power consumption and improving the electric power generating efficiency of the solar cell.

Therefore, the primary objective of the present invention is to provide a rail-type solar tracking system with a focusing function, and the system comprises a plurality of support elements, a Fresnel lens, a rail platform, a load bearing platform and a pushing device, and a solar cell on the load bearing platform can be moved to a focus position where sunlight is focused by the Fresnel lens for collecting solar energy, and thus it is not necessary to move the heavy lenses for an effective collection of solar energy, and the invention can achieve the effects of reducing power consumption and improving the electric power generating efficiency of the solar cell.

To achieve the foregoing objective, the present invention provides a rail-type solar tracking system with a focusing function, and the system comprises a plurality of support elements, for supporting the periphery of a Fresnel lens; a rail platform, disposed under the Fresnel lens, and having a first rail installed separately on both sides of the rail platform; a load bearing platform, disposed between the first rails, and movable along the first rails, and having a solar cell and a plurality of sensors carried thereon, and the solar cell being provided for collecting solar energy and converting the solar energy into electric energy, and the sensors being provided for detecting a focus position of sunlight after the sunlight is passed through the Fresnel lens; and a pushing device, for pushing the load bearing platform to displace the solar cell on the loading bearing platform to the focus position.

Compared with the structure of the prior art, the structure of a rail-type solar tracking system with a focusing function in accordance with the present invention can achieve the effects of reducing the power consumption and improving the electric power generating efficiency of the solar cell.

DESCRIPTION OF THE PREFERRED EMBODIMENT

To make it easier for our examiner to understand the objectives, characteristics and effects of the present invention, we use preferred embodiments with related drawings for the detailed description of the invention as follows.

Figure 1:
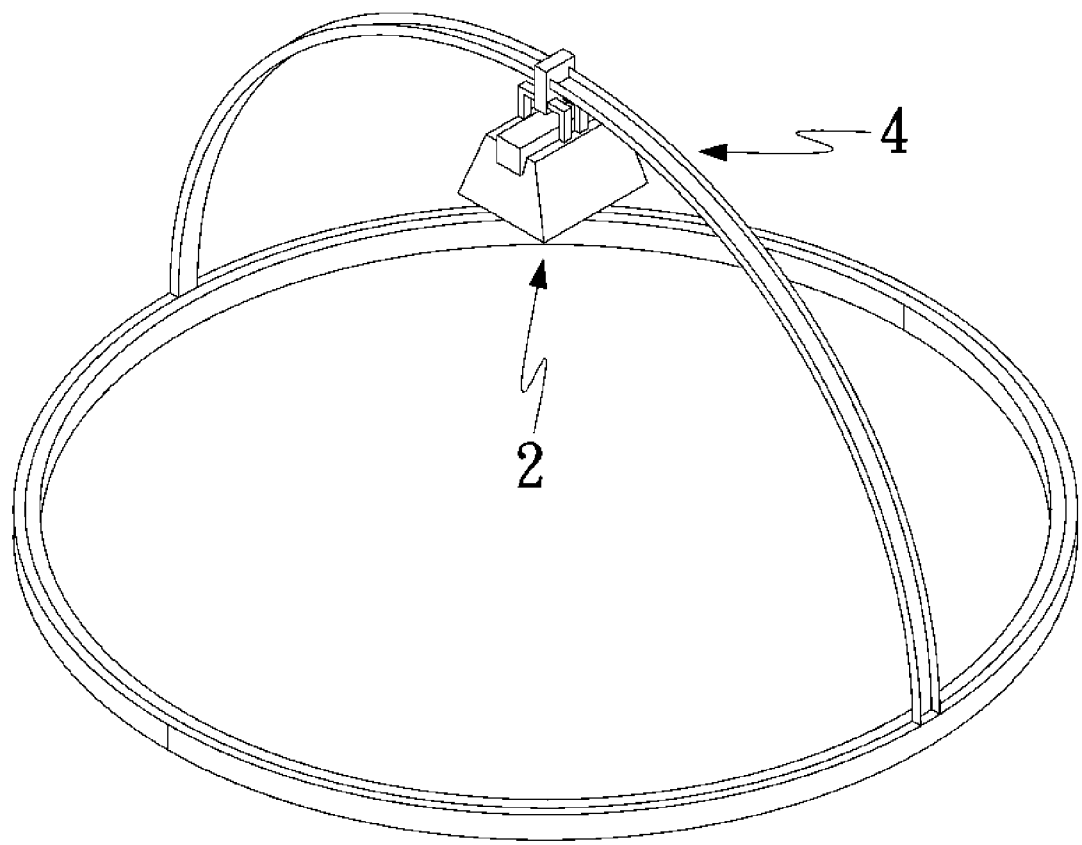
FIG. 1 is a perspective view of a mechanical structure for simulating the movement of the sun in accordance with the present invention.
Figure 2:
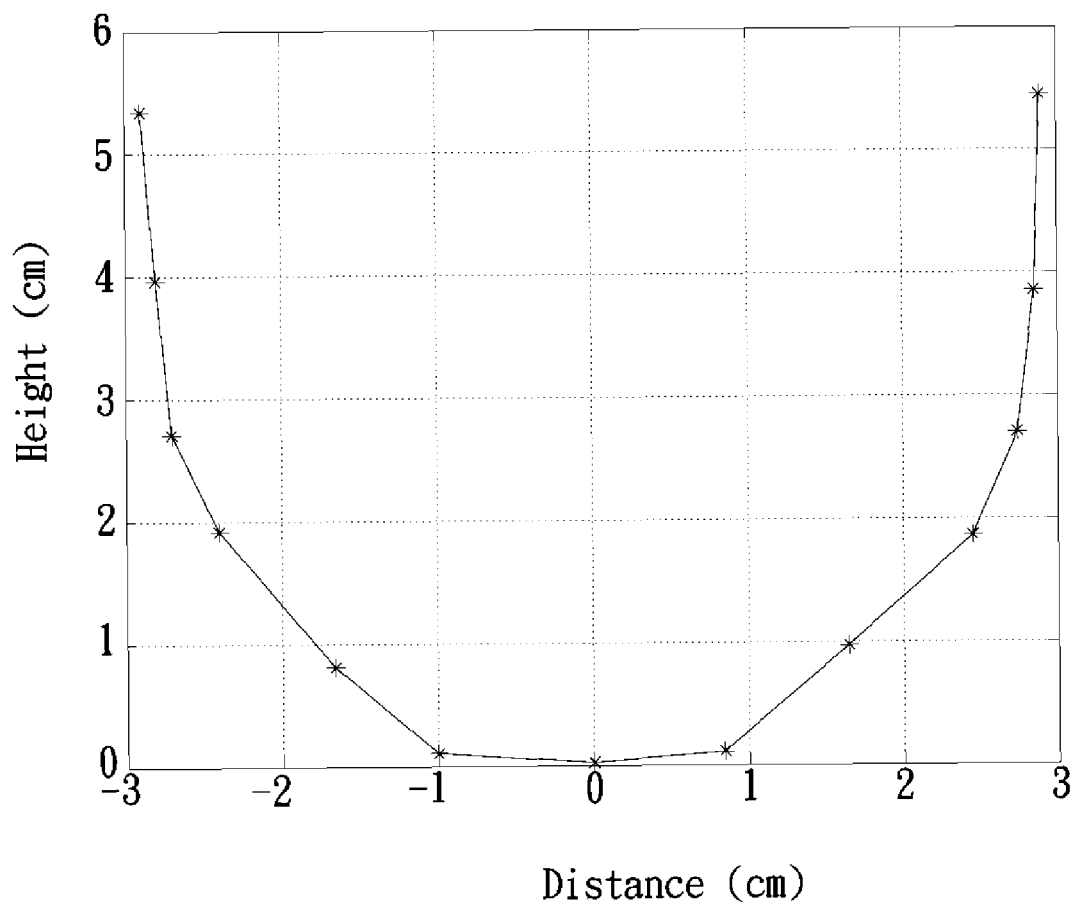
FIG. 2 shows a focusing track of a Fresnel lens in accordance with the present invention.

Firstly, the focusing track of a Fresnel lens under the sunlight is simulated by software, and it is found that the focusing track is substantially a V-shaped curve, and then a mechanical structure as shown in FIG. 1 is used for simulating the movement of the sun to verify the focus of the Fresnel lens. When the sun 2 moves from the east to the west on a track 4, and the produced focuses also move from the west to the east to form the focusing track of the lens as shown in FIG. 2.

Figure 3:
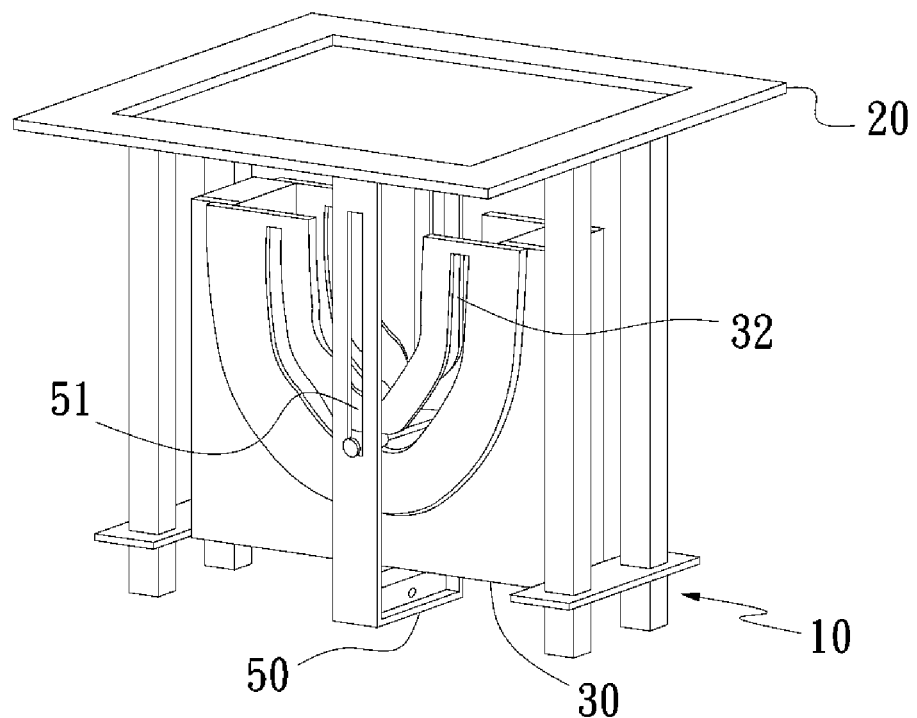
FIG. 3 is a schematic view of the present invention.
Figure 4:
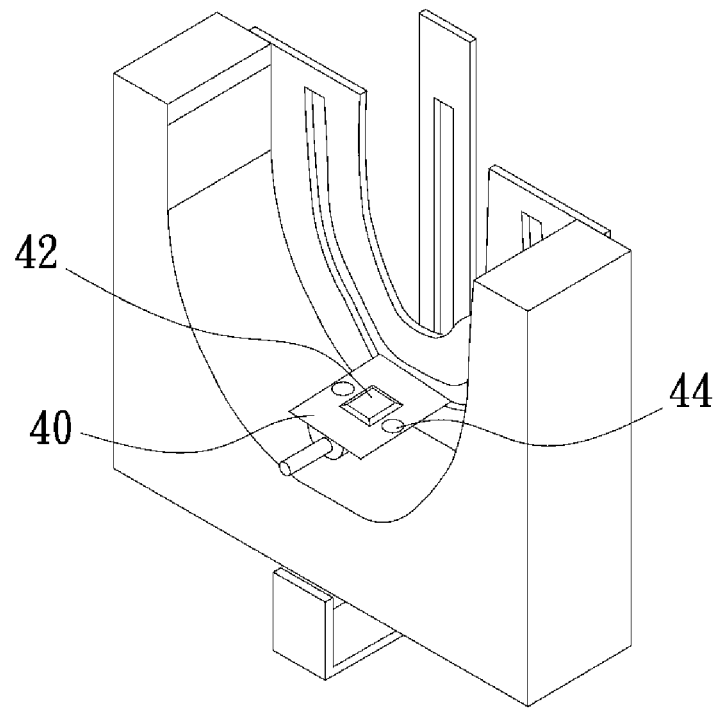
FIG. 4 is a schematic view of a load bearing platform disposed on a rail platform in accordance with the present invention.

With reference to FIGS. 3 and 4 for a schematic view of the present invention and a schematic view of a load bearing platform on a the rail platform in accordance with the present invention respectively, the present invention provides a rail-type solar tracking system with a focusing function, and the system comprises a plurality of support elements 10, a Fresnel lens 20, a rail platform 30, a load bearing platform 40 and a pushing device 50. The support elements 10 are provided for supporting the periphery of the Fresnel lens 20, and the Fresnel lens 20 is fixed at the top of the support elements 10 and remains still after it is adjusted to the focal distance. The rail platform 30 is disposed under the Fresnel lens 10 and has a first rail 32 installed separately on both sides of the rail platform 30, and the track of the first rail 32 is a focusing track formed at the focus position where sunlight is focused by the Fresnel lens. The focusing track is substantially a V-shaped curve, and the first rails 32 are made of stainless steel for enhancing its strength and complying with the requirement of repeated uses. The load bearing platform 40 is disposed between the first rails 32 and moved along the first rails 32, and has a solar cell 42 and a plurality of sensors 44 carried on the load bearing platform 40. The solar cell 42 is provided for collecting solar energy and converting solar energy into electric energy. The sensors 44 are provided for detecting a focus position where sunlight is focused by the Fresnel lens 20. The pushing device 50 is provided for pushing the load bearing platform 40 to move the solar cell 42 on the load bearing platform 40 to the focus position.

From the aforementioned system of the invention, the solar cell 42 is driven by the mechanical structure of the pushing device 50 to move along the first rails 32, and the pushing device 50 drives the load bearing platform 40 to move, so that the solar cell 42 on the load bearing platform 40 can collect solar energy effectively. Compared with the prior art, the invention can greatly reduce the weight and the power consumption of the motor, so as to enhance the electric power generating efficiency of the solar cell.

Figure 5:
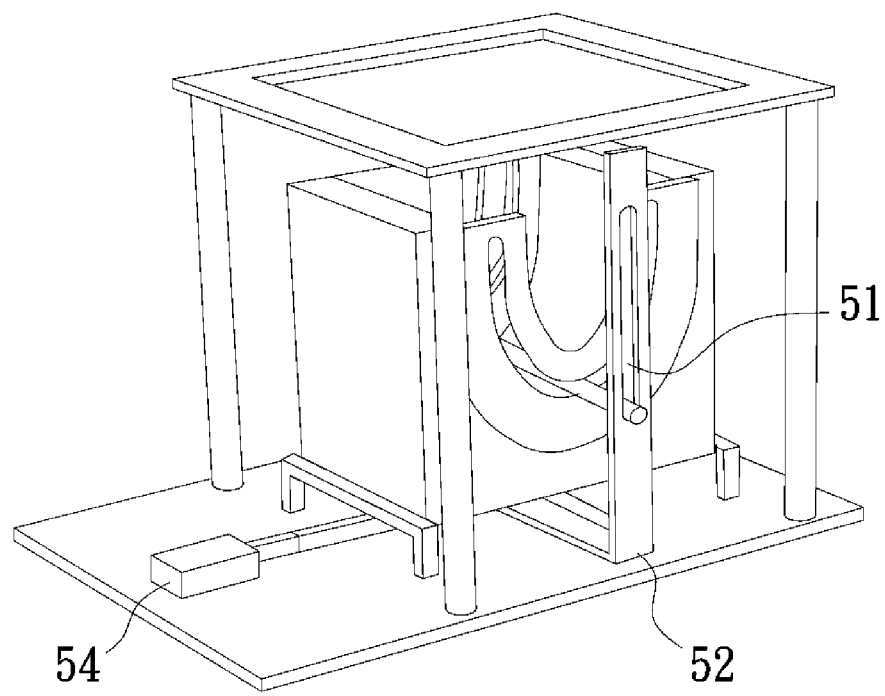
FIG. 5 is a perspective view of a preferred embodiment of the present invention.

With reference to FIG. 5 for a perspective view of a preferred embodiment of the present invention, the pushing device 50 comprises a U-shaped mechanical structure 52 and a first motor 54. The U-shaped mechanical structure 52 can be made of aluminum alloy and has a second track 51 which is a track perpendicular to the U-shaped mechanical structure 52 and disposed on the U-shaped mechanical structure 52. The load bearing platform 40 is disposed between the second tracks 51 and restrained by the second tracks 51. The first motor 54 is provided for driving the U-shaped mechanical structure 52 to move along the direction of the track of the first rail 32, so that the load bearing platform 40 on the rail platform 30 moves along the first rail 32. To overcome the deviation of the focus position caused by different sun tracks of the four seasons, the invention increases the solar energy collecting area of the solar cell 42, so that the sunlight falls within the collecting area of the solar cell 42 regardless of the changing focus position in different seasons.

Figure 6:
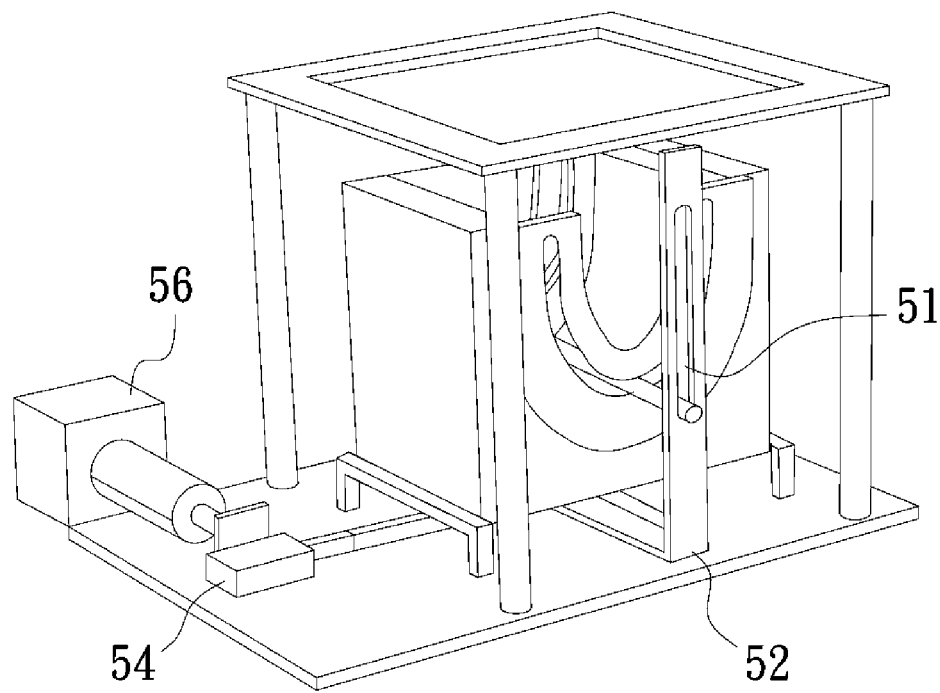
FIG. 6 is a perspective view of another preferred embodiment of the present invention.

With reference to FIG. 6 for another preferred embodiment of the present invention, the pushing device 50 comprises a U-shaped mechanical structure 52, a first motor 54 and a second motor 56. The U-shaped mechanical structure 52 can be made of aluminum alloy and has a second track 51 which is a vertical track, and the load bearing platform 40 is disposed between the second tracks 51 and restrained by the second tracks 51. The first motor 54 is provided for driving the U-shaped mechanical structure 52 to move along the track of the first rail 32, so as to move the load bearing platform 40 on the rail platform 30 along the first rail 32. The second motor 56 is provided for driving the U-shaped mechanical structure 52 to move in a direction perpendicular to the track of the first rail, so as to move the load bearing platform 40 on the rail platform 30 along the perpendicular direction of the first rail 32. To overcome the deviated focus position caused by the different tracks of the sun in different seasons, this embodiment adopts a two-dimensional movement, so that when the track of the sun in different seasons varies, the second motor 56 is used for driving the first motor 54, such that the U-shaped mechanical structure 52 can be moved in a 2D direction, and the solar cell 42 on the load bearing platform 40 is moved in along a 2D direction to the focus position, and such arrangement complies with the focusing track produced by the Fresnel lens in different seasons.

| | Type of Solar System | | |
| --- | --- | --- | --- |
| | Fixed Type | Tracking Type | This Invention |
| Total energy (mJ) collected from 10 to 14 spots | 10594 | 10804 | 14744 |
| Total energy (deg.) collected from 10 to 14 spots | 2.649 × 10−3 | 2.701 × 10−3 | 3.686 × 10−3 |

-continued

| | Type of Solar System | | |
|---|---|---|---|
| | Fixed Type | Tracking Type | This Invention |
| Total energy (mJ) collected from 8 to 16 spots | 20302 | 21651 | 22194 |
| Total energy (deg.) collected from 8 to 16 spots | $2.538 \times 10^{-3}$ | $2.706 \times 10^{-3}$ | $2.774 \times 10^{-3}$ |
| Increase % (10 to 14 spots) | 0 | 1.982 | 39.173 |
| Increase % (8 to 16 spots) | 0 | 6.645 | 9.319 |

Table 1 compares the electricity of different types of solar power generation systems. In Table 1, we can observe that the electric power generating efficiency of the solar cell is better than the prior art. Compared with the fixed solar system, the invention increases the power generation capacity by 39%.

In summation of the description above, the present invention complies with the requirements of patent application, and adopts a plurality of support elements, a Fresnel lens, a rail platform, a load bearing platform and a pushing device to move a solar cell on the load bearing platform to a focus position where sunlight is focused by the Fresnel lens to collect solar energy. Hence, the invention collects solar energy without moving heavy lens so as to reduce power consumption and improve the electric power generating efficiency of the solar cell. Obviously, the products derived from the invention can fully meet the current market requirements.

While the invention has been described by means of specific embodiments, numerous modifications and variations could be made thereto by those skilled in the art without departing from the scope and spirit of the invention set forth in the claims.

What is claimed is:

1. A rail-type solar tracking system with a focusing function, comprising:
    a plurality of support elements for supporting a periphery of a Fresnel lens;
    a rail platform disposed under the Fresnel lens, and having a first rail installed separately on both sides of the rail platform;
    a load bearing platform disposed between the first rails, the load bearing platform being movable along the first rails and having a solar cell and a plurality of sensors carried thereon, the solar cell being provided for collecting a solar energy and converting the solar energy into an electric energy, the sensors being provided for detecting a focus position of sunlight after the sunlight is passed through the Fresnel lens;
    a pushing device for pushing the load bearing platform to displace the solar cell on the loading bearing platform to the focus position, wherein the pushing device includes a U-shaped mechanical structure having a second track disposed perpendicularly on each side of the U-shaped mechanical structure, the load bearing platform being disposed between the second tracks without being restrained by the second tracks; and
    a first motor, for pushing the U-shaped mechanical structure to move along a track direction of the first rail, so as to move the load bearing platform on the rail platform along the first rail.

2. The system of claim 1, wherein the first rail has a track which is a focusing track of the focus position formed by passing sunlight through the Fresnel lens.

3. The system of claim 2, wherein the first rail is substantially in a V-shaped curve.

4. The system of claim 1, wherein the pushing device comprises:
    a second motor, for pushing the U-shaped mechanical structure to move in a direction perpendicular to the track direction of the first rail, so as to move the load bearing platform on the rail platform along a direction perpendicular to the first rail.

5. The system of claim 1, wherein the U-shaped mechanical structure is made of an aluminum alloy.

6. The system of claim 4, wherein the U-shaped mechanical structure is made of an aluminum alloy.

* * * * *